March 30, 1937.  I. H. GASKIN  2,075,710

SMALL MOTOR

Filed July 11, 1936

INVENTOR
Ivan H. Gaskin.
BY
ATTORNEY

Patented Mar. 30, 1937

2,075,710

UNITED STATES PATENT OFFICE 2,075,710

SMALL MOTOR

Ivan Henly Gaskin, Watertown, Mass., assignor to Gillette Safety Razor Company, Boston, Mass., a corporation of Delaware Application July 11, 1936, Serial No. 90,250

4 Claims. (Cl. 172—36)

This invention relates to small motors of the magnetic attraction type operating on a make-and-break circuit, such for example as those employed to actuate the moving parts of dry shaving implements. These motors, which are of a small fraction of a horsepower in rating, as heretofore constructed have had a rotor of two or more poles formed as more or less separate and distinct radial arms. Such motors operate at a high speed of between 3000 and 5000 R. P. M. and are ordinarily subject to a large loss by windage friction. I have discovered that an unexpected and unpredictable increase in efficiency of such motors may be effected by modifying the shape of the rotor so that it presents a smooth continuous circumferential surface by which the windage friction is reduced to a minimum.

In one aspect, therefore, the present invention consists in a magnetic attraction motor operating on a make-and-break circuit and having a rotor which presents a smooth continuous circumferential surface. This result may be effected by filling in the space between the poles of the rotor with any material capable of remaining permanently in place and of taking a smooth surface finish.

As herein shown, I prefer to employ a metal, such as lead, for example, for the purpose of filling in the spaces between the poles of the rotor, and under these circumstances I secure the further advantage of increasing the movement of inertia of the rotor. This is particularly important because the rotary impulse is exerted upon the poles of the rotor only through a limited angle; in a bipole rotor, for example, only through two arcs of 85° each. In other words, throughout 190° of its rotation the inertia of the rotor alone is depended upon to keep the motor running. By utilizing lead or other metal of appreciable weight I not only reduce the windage friction as above explained, but also substantially increase the moment of inertia of the rotor and thereby tend to smooth out the character of its rotation and to prevent accidental stalling.

These and other features of the invention will be best understood and appreciated from the following description of a preferred embodiment thereof, selected for purposes of illustration and shown in the accompanying drawing, in which.

Figure 1:
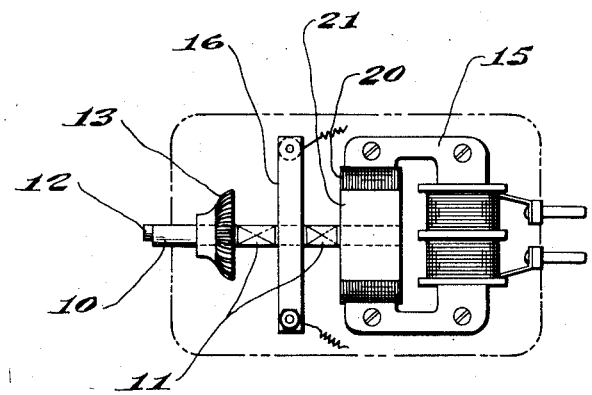
Fig. 1 is a somewhat diagrammatic assembly view of the motor.

In Fig. 1 the parts of the motor are shown as assembled in a frame or casing which may be of any desired shape and which is indicated conventionally in dot and dash lines. The main shaft 10 of the motor is suitably journaled for rotation in spaced bearings 11 which are rigidly supported by a frame or casing. At its forward end the shaft carries an eccentric pin 12 by which a rapid vibration of small amplitude is imparted to the movable member of the shaving implement or to any driven element. Since motors of this type are not self-starting the shaft 10 also carries a knurled disk 13 by which the operator may spin the shaft in starting the motor.

A field magnet 15 having oppositely disposed pole pieces is also mounted within the casing or frame. The field magnet is herein shown as generally U-shaped and the inner end of the shaft 10 terminates just short of the body portion thereof. The energizing circuit is lead to the windings of the field magnet through a make-and-break switch member 16 which extends transversely across an intermediate portion of the shaft 10 and this is provided with an eccentric, not shown, for lifting the switch member 16 and holding the circuit open throughout approximately 190° of the rotation of the shaft divided into two intervals.

Figure 2:
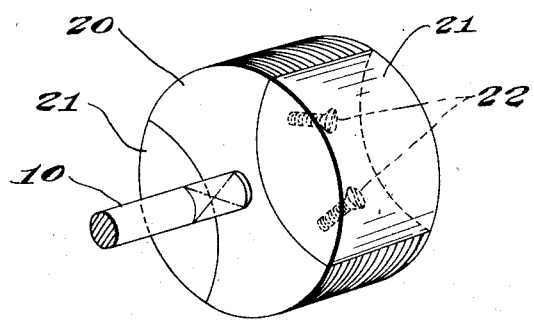
Fig. 2 is a view in perspective of its rotor.

The rotor, as best shown in Fig. 2, is rigidly secured to the inner end of the shaft 10. It has two poles comprising a pair of sector-shaped arms 20 formed of superposed sheets of iron lamina. The radial or generally radial surfaces of the arms 20 forming the poles of the rotor are covered and the space between them completely and smoothly filled by cast lead sectors or segments 21. These may be held in place by any desired means but as herein shown each sector is cast of lead upon a pair of screws 22 which project in convergent relation from the opposite walls of the arms 20 (one pair only being shown). The lead sectors 20 comprise homogeneous bodies completely filling the space formerly occurring in the rotor and having flat end faces which are flush with the end faces of the arms 20 and smooth, finished circumferential faces which are concentric and flush with the circumferential faces of the poles 20. In other words, the rotor comprises a geometrically complete disk whose surfaces present no configuration developing a windage friction even when rotated at a high rate of speed.

In practice it has been found that the motor of my invention will develop at least a 20% increase in power output as compared to a rotor having exposed substantially radial surfaces.

Having thus described my invention what I claim as new and desire to secure by Letters Patent of the United States is:—

1. A magnetic attraction motor operating on a make-and-break circuit and comprising field magnets, and a rotor having a smooth continuous circumferential surface reducing the windage friction of the rotor to a minimum.

2. A magnetic attraction motor operating on a make-and-break circuit and comprising field magnets, and a multipolar rotor with the spaces between its poles filled with material presenting a smooth continuous circumferential surface.

3. A magnetic attraction motor operating on a make-and-break circuit and having field magnets, and a multipolar rotor including laminated metallic arms having generally radial surfaces and metallic filler included between each pair of arms, presenting a smooth circumferential surface and thereby reducing windage friction to a minimum.

4. A small magnetic attraction motor operating on a make-and-break circuit and having field magnets, and a multipolar rotor having a body of laminated sheet iron shaped to present radially spaced arms and a lead filler permanently secured in place between each pair of arms and presenting flat end faces flush with the end faces of the rotor and curved outer faces concentric with the circumferential face of the motor, thereby reducing windage friction of the rotor to a minimum and increasing its moment of inertia.

IVAN H. GASKIN.